Aug. 2, 1960     N. S. DODGE, JR., ET AL     2,947,409
RESILIENT IDLER AND SUPPORT
Filed Oct. 7, 1957
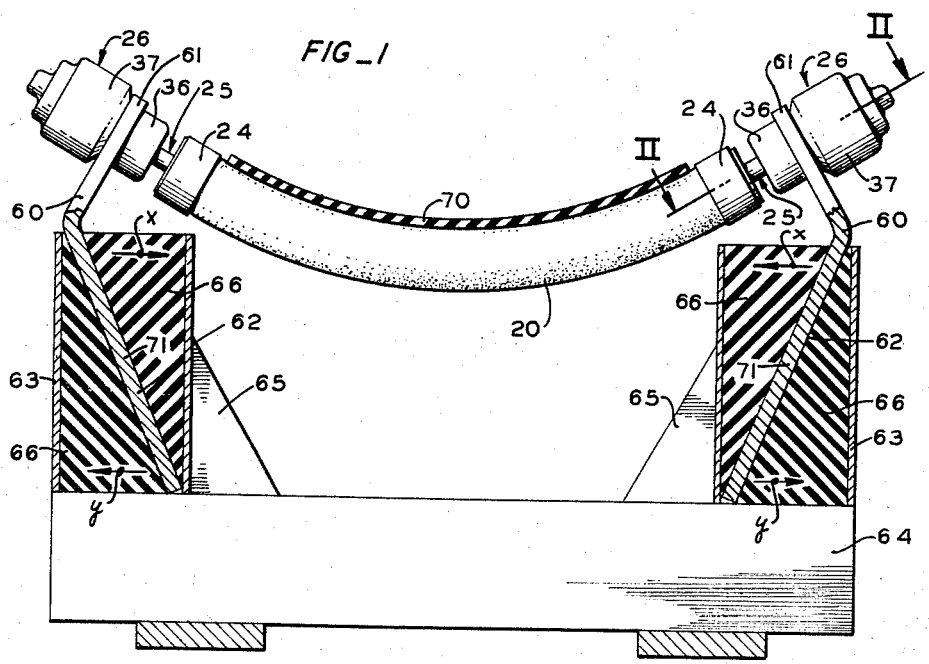
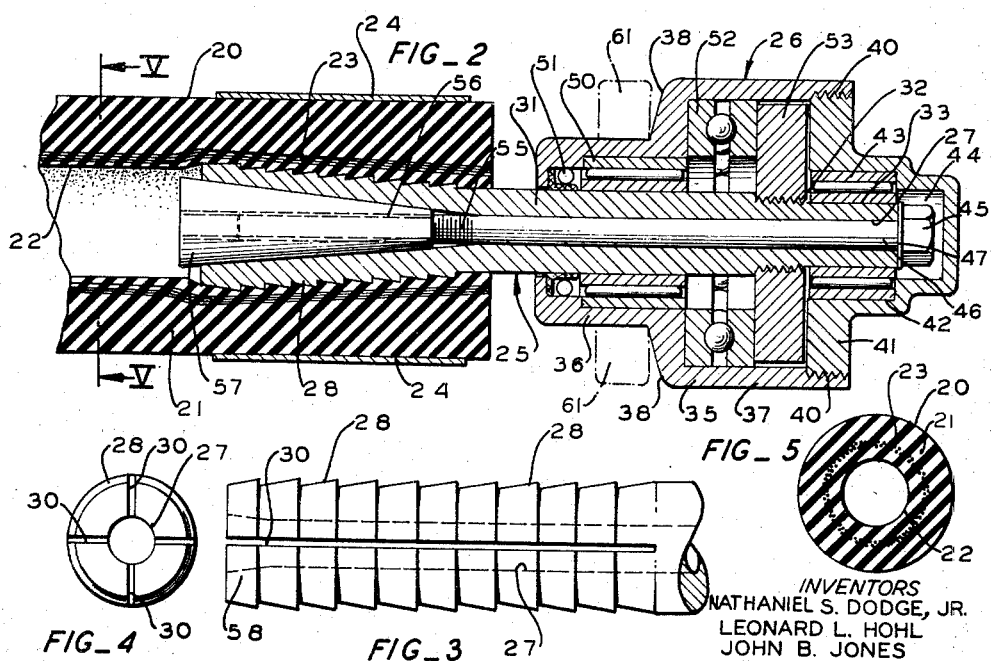
INVENTORS
NATHANIEL S. DODGE, JR.
LEONARD L. HOHL
JOHN B. JONES
MERVIN E. NEGLEY

United States Patent Office 2,947,409
Patented Aug. 2, 1960

2,947,409

RESILIENT IDLER AND SUPPORT

Nathaniel S. Dodge, Jr., Orinda, Leonard L. Hohl, Berkeley, and John B. Jones and Mervin E. Negley, Oakland, Calif., assignors to The American Rubber Manufacturing Co., Oakland, Calif., a corporation of California Filed Oct. 7, 1957, Ser. No. 688,691

7 Claims. (Cl. 198—192)

This invention relates to idler support assemblies and mountings for idlers in connection with traveling or conveyor belt systems, including idlers therefor, and particularly idlers of the suspension type.

In the customary establishment of conveyor belt systems a number of idler rollers are suspended from opposite sides of the conveyor frame at spaced intervals. The curvature of the idler and the relation of the supports for the bearing mountings, if any, are predetermined in consideration of such factors as loading, tension and thickness of the belt, spacing of the idlers, and many others, in order to provide complete support for the belt and proper troughing conditions. However, it is not possible to maintain these factors precisely uniform at all times during operation. It is, therefore, an object of the present invention to provide an idler suspension arrangement which will accommodate to the various changes which occur in actual operation when and as they occur so that the belt support is even and continuous. In this way trouble-free continuous operation is secured.

The practice in providing suspension of idler rollers for belt conveyors has, until now, been with the object of providing an idler which would rotate in a catenary between its supports at its opposite ends with suitable bearings fixed against lateral movement. This practice overlooks or does not take into account what now appears as an obvious fact, that the friction induced by the engagement of the idler and the belt will tend to move the idler laterally in the direction of the travel of the belt. When this occurs it is plain that an undue stress is applied to the idler bearings which are rigidly mounted against lateral movement. This stress causes bearing failures, resulting in shutdowns and other delays, all of which increase the cost per ton of material handled.

It is an important object of the present invention to provide an idler assembly and mounting which delivers all of the advantages of a bearing mounting fixed against longitudinal movement while at the same time eliminating the disadvantages thereof by specifically providing for limited lateral and limited universal movement.

Another object of the invention is to provide an idler member which is one complete flexible cylindrical resilient member stretching from one side to the other of the conveyor frames, and not dependent upon any core or like reinforcing member such as wire rope or nylon cord. The value of this roll is in its ability to stretch with impact throughout its entire length, whereas other impact rolls depend only upon the thickness of rubber armor from the outside to the core for a cushion.

A further object is to provide a roll that not only takes advantage of the enormous tensile strength of rubber, which enables it to withstand the load, but also takes advantage of the mobility or compression action in rubber to cushion the impact and then, through its resilience, return to its original form.

A still further object is to provide an idler assembly where the resilient idler member and its roller shafts are integral and rotate as a unit in bearing housings from which they are suspended and wherein the bearing housings themselves form a part of the assembly.

It is another object to provide an improved means and method of securing the roller shafts to the idler member to prevent failures through pull-outs, while at the same time providing for removal of the said shafts or either of them, for easy replacement when desired.

Another object is to provide a bearing assembly and housing which, although sealed for purposes of operation, is readily accessible for inspection or maintenance without removal from its mounting, if desired.

Still another object is to provide a practical resilient mounting for the supports for the idlers so that the greatest mass of resilient material is available for the greatest force.

A further object is to provide resilient mountings for the yoke supports which not only deflect or yield in a vertical plane in cushioning the shock or impact on the roll, the bearings and even on the entire frame, but which will also resiliently deflect or yield laterally in the direction of travel of the belt in order to overcome the drag of the belt, with the over-all result of prolonging the life of the entire unit.

Further objects are to provide a construction of maximum simplicity, economy, and ease of manufacture, also such further objects, advantages and capabilities as will fully appear and as are inherently possessed by the device and the invention described herein.

Invention further resides in the combination, construction and arrangement of parts illustrated in the accompanying drawings, and while there is shown therein a preferred embodiment thereof, it is to be understood that the same is merely illustrative of the invention and that the invention is capable of modification and change, and comprehends other details of construction without departing from the spirit thereof or the scope of the appended claims.

Referring to the drawings:

Figure 1 is a transverse elevational view of a belt conveyor system showing one of the idlers of the present invention, showing the mounting thereof in section, and showing the movable longitudinal belt supported thereon, also in section;

Figure 2 is a section taken on the line II—II of Figure 1, looking in the direction of the arrows;

Figure 3 is a fragmentary elevational view of the split end of the roller shaft in its normal unexpanded form;

Figure 4 is an end view of the roller shaft showing the longitudinal splits or cuts; and Figure 5 is a transverse section of the resilient element of the idler in a reduced scale taken on the line V—V of Figure 2, looking in the direction of the arrows.

Referring now more particularly to the drawings in which like reference numerals indicate like parts in the several views, and with particular reference to Figure 1, the transverse supporting element for the idler of the present invention is a continuous, cylindrical resilient member 20 comprising a tube of compounded rubber, either natural or synthetic, elastomers, or a combination of any, having a wall 21 of substantial thickness and an axial aperture 22 extending therethrough. The resilient member 20 of the idler may be reinforced. This reinforcement is made longitudinally by cords 23, which are preferably nylon cords or strands which will permit the resilient member to stretch longitudinally or compress, or both. The reinforcing material 23, when used, is imbedded in the resilient material of the idler 20, adjacent the axial aperture 22, as shown in Figures 2 and 5. The resilient cylinder 20 is bound adjacent each end thereof with a nonresilient collar 24 of steel or the like, which collar is intended to retain and maintain the normal shape and diameter thereof. The collars 24 may be secured to the idler 20 in any suitable manner such as vulcanizing, press fit, adhesives, or the like. However, it has been found desirable to cure the collars 24 in their proper positions on the member 20.

The roller member 20 is intended to be rotated by and with a roller shaft 25 which is mounted for rotation in a suitable bearing housing and assembly generally indicated by the numeral 26. The roller shaft is formed with several longitudinal sections and may generally be described as a hollow cylinder having an aperture 27 extending axially therethrough. Commencing at its inner end, it is provided with a series of circumferential inwardly-pitched stepped wedges 28 which extend for nearly half or a substantial portion of its entire length. Also, from its inner end there are longitudinal radial cuts 30 which are preferably not only coextensive in length with the series of stepped wedges 28 but extend for a short distance into the main cylindrical portion 31 of said shaft. The main cylindrical portion 31 is the main bearing surface for the rotation. Toward the outer end of the roller shaft 25, the diameter is reduced to provide threads 32 for a short distance, and then beyond and adjacent to the threads the diameter is again reduced to provide a smooth bearing surface 33 which extends to the outer end thereof.

The bearing and housing assembly referred to by the numeral 26 has a suitable main housing 35, having a smaller diameter at 36 and a larger diameter 37 toward the outer end thereof. The external shoulder 38, which joins the two diameters, is tapered inwardly for purposes which will be explained later. The housing 35 at the terminus of the larger diameter 37 is internally threaded at 40 to receive a housing cover member 41. The housing cover member 41 has two internal recesses of progressively smaller diameters. The larger recess 42 retains the roller bearing 43 which surrounds the portion 33 of the roller shaft and it is on this bearing that the end portion 33 rotates. The smaller recess 44 merely provides a sealed cover for the hexagonal head 45 of the pull-up bolt 46 and the washer 47. The main portion of the roller shaft 31 passes axially through the housing 36 and partially through the housing 37. It is surrounded therein and rotates on roller bearings 50 which are sealed from the inside by suitable seals 51. The larger diameter 37 of the housing 35 contains thrust bearing 52. The thrust bearing is held in position within the housing by thrust washer 53 which is internally threaded at its central aperture to engage the threads 32 on the roller shaft 25. As will be observed from Figures 1 and 2, the bearings on which the roller shaft 25 rotates are all sealed and enclosed within the housing 35 against dirt, contamination or other damage. However, they are easily accessible and by merely removing the housing cover plate 41, the entire internal bearing system is made completely available for cleaning, repair, or replacement. This is important in maintenance, for each bearing may be inspected by merely going down the outside of the conveyor system and without the removal of the entire idler.

As will be observed by reference to Figure 2, the shaft 25 has a longitudinal aperture 27. This aperture is for slideably receiving a pull-up bolt 46 having a hexagonal head 45 and a washer 47. The inner end of the pull-up bolt 46 is externally threaded, as at 55, to engage the internal threads 56 of a truncated cone plug 57. The inner end of the longitudinal aperture 27 is flared outwardly slightly as at 58 (see Figure 3) so as to engage the smaller inner end of the plug 57 and act as a guide. It is apparent that when the hexagonal head 45 of the pull-up bolt 46 is properly rotated, the cone wedge 57 will be pulled longitudinally toward the head. The radial cuts 30 permit this inner end portion of the shaft 25 to spread outwardly and expand so that the stepped segments 28 engage and bite into the resilient material of the walls 21, compressing the same against the confinement of the collars 24. Accordingly, the resilient member 20 of the idler is secured to the roller shaft 25 in such a manner that the shaft 25 may not be pulled from its engagement with the cylindrical roller 20, except intentionally, but its original resilience and diameter are retained. Obviously, the roller shaft may be removed by reversing the steps above described.

It is to be observed that such a housing and bearing assembly is secured at each end of the idler roller 20 and forms a compact unitary idler assembly. Each idler unit may be easily and quickly removed and replaced in the event of trouble, thus saving an enormous amount of trouble and conveyor shutdown time. It will be observed that this unit provides maximum strength as well as uniform curvature, and will not displace itself when pressure is applied.

Impact rollers, made without any reinforcement such as 23, provide a unit in which the impact is absorbed throughout the entire length of the resilient member 20 and is accomplished by its momentary elongation. Impact and load are not absorbed in limited segments. Likewise, the units do not rely upon the thickness of resilient armor around a solid or semisolid core for impact resistance, as indicated by the units of the prior art.

This idler assembly with its freely rotating resilient member 20 is suspended between two identical yokes 60. The forks 61 of the yokes 60 engage and partially encompass the smaller diameter 36 of the housing 26. The outer face of the yokes 60 engage the sloping face 38 of the housing 35 so as to accommodate any temporary axial misalignment. It is apparent that the idler units are not rigidly held in position but merely rest freely in forks of the yokes, and can move with a limited universal movement therein. It will be observed that the bearing housing itself can rotate in the fork of the yoke, as it is not held in fixed position. The stems 62 of the yokes 60 are bent inwardly below the forks thereof to the desired angularity for the support of the idler in accordance with standard practices and calculations for varying loads, purposes and materials. The angularity should leave the yokes 60 in a plane substantially perpendicular to the axis of rotation of the roller shafts 25. The stems 62 of the yokes 60 are held diagonally as shown in Figure 1 within the supports 63. The supports 63 are preferably hollow square tubing, secured vertically in any suitable manner to the transverse supports 64 of the general framework of the belt conveyor. Solid diagonal web members 65 may be placed inwardly of the square tubing supports 63 in order to buttress them against the pressures and forces exerted by the pull on the yokes. Above and below the stems 62 of the yokes 60, and within the square tubing supports 63, are diagonal solid rubber blocks 66, which conform to the unstressed angularity of the stem retained within the support. If necessary, a suitable removable cover plate may be provided for each of the square tubing supports 63.

It will be observed that the arrows "X" in the upper rubber mounting blocks 66 indicate the direction of the forces applied when weight or load is applied to the belt 70 of the conveying system, while the arrows "Y" indicate the force applied against the lower blocks of the mounting. As will be seen in Figure 1, the maximum force is always applied against the maximum mass in both the upper and lower rubber blocks.

Obviously, in a continuous moving belt system, the weight distribution is not equal, either longitudinally or transversely, even though every effort is made to keep the loading on the belt substantially uniform. To some extent variations in the weight loading of the belt are taken up by the resiliency of the belt itself, and to some extent the weight variations are taken up by the resiliency of the member 20. However, when the load is applied and carried by the belt 70, the load is transferred to the yokes 60 at either side. The diagonal mounting of the stems 62 of the yokes under working conditions causes the stems to move and rotate around a theoretical movable pivot point 71. Accordingly, at each side the forces are applied at the top in the direction of the arrows marked "X" and at the bottom in the direction of the arrows marked "Y" with a movement which is accordingly equal and opposite. Thus, the forces are absorbed by the resilient blocks 66 in the areas of their greatest bulk, and much of the force is thereby cancelled by the provision of this mounting.

The position of rest is shown for the idler unit in Figure 1 and is suspended in a vertical plane on the yoke mountings 60. Theoretically, the belt is intended to pass over the support rollers 20 which rotate freely on their roller shafts 25 and the bearings of the housing unit 26, without disturbing the vertical alignment. However, in practice, friction and load factors involved in the engagement of the moving belt 70 on the resilient supports 20, called belt drag, cause the suspension of the rollers to move or bow in the direction of the travel of the belt 70. It will be observed that this tendency would be a great strain on the yokes 60 and the forks 61 and constantly twist them to misshapening in the event the idler units were rigidly secured to the yokes. Also, this misalignment would eventually cause the shafts to bind and freeze. The resilient mounting for the yokes permits a modicum of rotation without interfering with the ability of the yoke mounting to absorb horizontal, as well as shocks in a vertical plane. Also, in the present invention the rounded, tapered shoulder 38 of the bearing housing 26 provides an area for rocking movement in any direction and accommodates the transverse axial misalignment resulting from operation.

It is also to be observed that the idler unit, and particularly the housing 26 thereof, is not secured in any way within the forks 61 of the yokes 60, but are merely dropped into the fork and rest therein. Not only are these freely removable for replacement and repair, but any longitudinal misalignment is not transferred to the bearings.

It is evident that all of the objects of the present invention are obtained by this structure for a roller support for belt conveyors, with a minimum of equipment and without the usual disadvantages of maintenance and repair for existing equipment.

We claim:

1. A support for traveling troughing belts, comprising in combination an idler assembly having a resilient transverse idler member, nonresilient collars adjacent each end of said resilient member, roller shafts, a portion of each of said shafts being expandably secured within the opposite ends of said resilient member which is held against external distortion by said collars, bearings for rotatably mounting the exposed ends of said shafts, a bearing housing for said bearings having an inward portion of smaller diameter than the outer portion with a shoulder there connecting, supporting members one at each side having yokes for receiving the smaller diameter of said bearing housings and having stems angled transversely inwardly, substantially square tubular rigid members secured to the frame for the traveling belt transversely oppositely disposed for receiving the stems of each of said supporting members and solid triangular shaped resilient packing means for said stems in said rigid members, so that the maximum force is applied against the maximum mass.

2. A support for traveling troughing belts, comprising in combination an idler assembly having a resilient transverse idler member, nonresilient collars adjacent each end of said resilient member, roller shafts, a portion of each of said shafts being expandably secured within the opposite ends of said resilient member which is held against external distortion by said collars, bearings for rotatably mounting the exposed ends of said shafts, a bearing housing for said bearings having an inward portion of smaller diameter than the outer portion with an inwardly tapered shoulder there connecting, supporting members one at each side having yokes for removably receiving the smaller diameter of said bearing housings and having stems angled transversely inwardly, substantially square tubular rigid members secured to the frame for the traveling belt transversely oppositely disposed for receiving the stems of each of said supporting members and solid triangular shaped resilient packing means for said stems in said rigid members, so that the maximum force is applied against the maximum mass.

3. A support for traveling troughing belts, comprising in combination an idler assembly having a solid resilient cylindrical transverse idler member having an axial opening therethrough, nonresilient collars adjacent each end of said resilient member, roller shafts, a portion of each of said shafts being expandably secured within the opening at the opposite ends of said resilient member which is held against external distortion by said collars, bearings for rotatably mounting the exposed ends of said shafts, a bearing housing for said bearings having an inward portion of smaller diameter than the outer portion with an inwardly tapered shoulder there connecting, supporting members one at each side having yokes for removably receiving the smaller diameter of said bearing housings and having stems angled transversely inwardly, substantially square tubular rigid members secured to the frame for the traveling belt transversely oppositely disposed for receiving the stems of each of said supporting members and solid triangular shaped resilient packing means for said stems in said rigid members, so that the maximum force is applied against the maximum mass.

4. A support for traveling troughing belts, comprising in combination an idler assembly having a solid resilient cylindrical transverse idler member having an axial opening therethrough, said opening being reinforced longitudinally by fibers embedded adjacent thereto, nonresilient collars adjacent each end of said resilient member, roller shafts, a portion of each of said shafts being expandably secured within the opening at the opposite ends of said resilient member which is held against external distortion by said collars, bearings for rotatably mounting the exposed ends of said shafts, a bearing housing for said bearings having an inward portion of smaller diameter than the outer portion with an inwardly tapered shoulder there connecting, supporting members one at each side having yokes for removably receiving the smaller diameter of said bearing housings and having stems angled transversely inwardly, substantially square tubular rigid members secured to the frame for the traveling belt transversely oppositely disposed for receiving the stems of each of said supporting members and solid triangular shaped resilient packing means for said stems in said rigid members, so that the maximum force is applied against the maximum mass.

5. An idler assembly for traveling belt conveyors comprising in combination a solid cylindrical resilient idler member having an axial opening therethrough for rotatably supporting the full width of the belt of a conveyor, nonresilient collars secured externally adjacent each end of said idler member, roller shaft members, one for each end of said idler member, a portion of each of which is expandably and axially secured for rotation therewith within the openings at the ends of said idler member against the confinement of said collars, said roller shaft members having an axial bore therethrough, external annular stepped wedges for the portion inserted within the axial opening of said resilient member, longitudinal radial cuts coextensive with said wedges and a draw-up bolt within said axial bore threadably receiving a cone-shaped plug cooperating with said cuts to accomplish the expandable securing of said shafts in said resilient member, bearings for rotatably mounting the outer ends of said roller shafts, and bearing housings for completely enclosing said bearings, each of said housings having an external removable cap for ready access to said bearings and being adapted to retain the assembly in mounting brackets with limited universal movement while maintaining the bearing-shaft alignment.

6. An idler roller assembly for traveling belt conveyors comprising in combination a cylindrical resilient idler member for rotatably supporting the entire width of the belt of the conveyor, nonresilient collar members secured externally adjacent each end of said idler member to maintain the normal diameter thereof, shafts mounted for rotation with said idler member, one for each end thereof, a portion of said shafts being axially and expandably secured within the ends of the idler member against the resistance of said collars by means accessible through the closure of the bearing housing, leaving the outer ends exposed, longitudinally spaced bearings for rotatably mounting each of the exposed ends of said shafts, and a housing for completely enclosing said bearings, said housing having a removable closure at its outer end for immediate access to and release of said bearings and said roller shafts.

7. An idler roller assembly for traveling belt conveyors comprising in combination a cylindrical resilient idler member for rotatably supporting the entire width of the belt of the conveyor having an axial opening therethrough, nonresilient collar members secured externally adjacent each end of said idler member to maintain the normal diameter thereof, shafts mounted for rotation with said idler member, one for each end thereof, a portion of said shafts being axially and expandably secured within the axial opening at the ends of the idler member against the resistance of said collars by draw bolts means accessible through the removable closure of the bearing housing, leaving the outer ends exposed, longitudinally spaced bearings for rotatably mounting the exposed ends of said shafts, and a housing for completely enclosing said bearings, said housing having an inward portion of smaller diameter than the outer portion adapted to be loosely inserted in and through the yoke of marginal supports, said outer portion having a removable closure and integrally joined to the inward portion by a tapered annular shoulder for bearing against the yokes of the marginal supports and providing limited universal movement while maintaining the bearing-shaft alignment.

References Cited in the file of this patent

UNITED STATES PATENTS

| | | |
|---|---|---|
| 618,681 | Jerome | Jan. 31, 1899 |
| 981,471 | Proal | Jan. 10, 1911 |
| 1,022,306 | Donahue et al. | Apr. 2, 1912 |
| 2,724,490 | Barnish | Nov. 22, 1955 |

FOREIGN PATENTS

| | | |
|---|---|---|
| 510,398 | Germany | Oct. 18, 1930 |